March 9, 1965 J. L. ENGLESBERG ETAL 3,172,850
INTEGRAL IMMERSIBLE FILTER AND PUMP ASSEMBLY
Filed Sept. 7, 1961
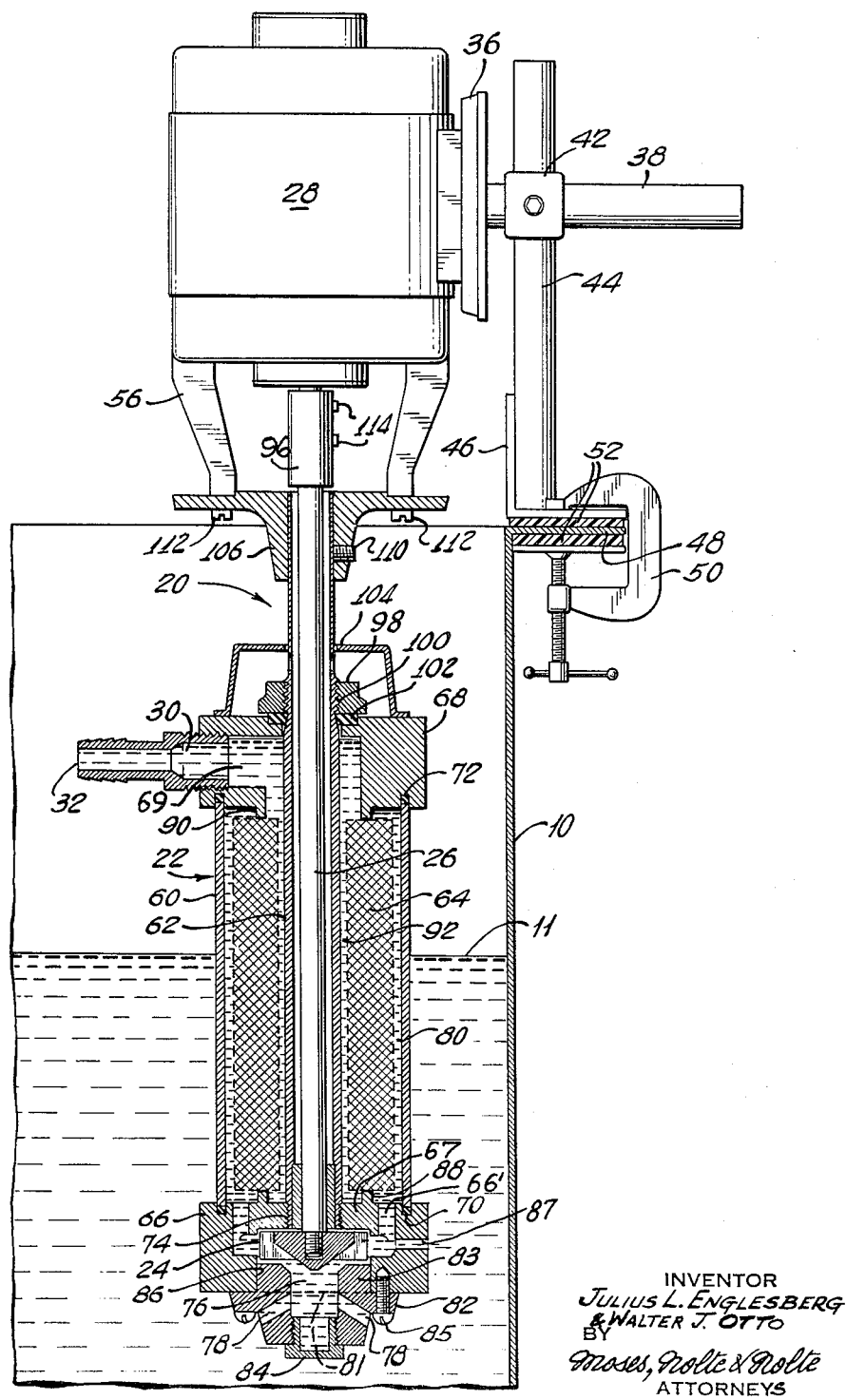
INVENTOR
JULIUS L. ENGLESBERG
& WALTER J. OTTO
BY
Moses, Nolte & Nolte
ATTORNEYS

United States Patent Office 3,172,850
Patented Mar. 9, 1965

3,172,850
INTEGRAL IMMERSIBLE FILTER AND
PUMP ASSEMBLY
Julius L. Englesberg, 123 Knollwood Road, Rockville Centre, N.Y., and Walter J. Otto, Brentwood, N.Y.; said Otto assignor to said Englesberg
Filed Sept. 7, 1961, Ser. No. 136,680
3 Claims. (Cl. 210—172)

This is a continuation-in-part of application for United States Letters Patent Serial No. 75,391, filed December 12, 1960, now abandoned.

This invention relates to immersible filters, for use in cleaning, treating, filtering, agitating and transferring a liquid or chemical solution such as used in an industrial operation.

In many industrial operations, a chemical solution or bath is employed, for example, as in a cleaning operation, during which many articles are placed in the bath and transported through it in order to subject the article to the action of the solution in the bath. Frequently and usually the articles that are placed in the bath and that are transported through the bath are dirty or have some insoluble foreign material on their surfaces, whose presence in the working solution of the bath is undesirable, if not actually harmful.

Using a plating tank solution as an example, it is necessary, in the case of many different types of plating solutions, that the solution be free of any foreign matter that might contaminate the solution and alter its chemical content and analysis to an extent that would render the solution ineffective.

In large industrial installations, where adequate space may be available, arrangements can be made to convey the solution from the bath to a filtering device outside of the tank itself and then back to the tank. In many cases, however, such extensive and expensive filtering equipment may not be necessary. Frequently, space may not be available. Moreover, in many installations it is sufficient to filter any individual tank by means of a small immersible filter since the amount of foreign matter introduced into the bath may not be sufficient to warrant an expensive and extensive external filtering system.

Presently existing pumps and filters utilized for this purpose have had difficulty in filtering shallow tanks, since they must generally be submerged to a substantial depth to prevent air from being trapped and to provide proper priming. In addition, it is desirable to provide means for agitating the solution to promote proper filtering and provide uniformity. Agitation has generally been provided by separate pumps and propeller arrangements which are costly and add to the motor load. In other applications, it is required that soluble materials, such as particular ions or colloidal impurities, be removed from liquids. This also has been difficult to accomplish with known equipment.

The primary object of this invention, therefore, is to provide an immersible filter that may be immersed in an industrial chemical solution, such as a plating bath, to establish circulation and agitation of the fluid in the bath and at the same time to filter or treat the solution and remove any foreign particles or undesired material therefrom that would either affect the proper operation of the plating bath or that might come in contact with articles to be cleaned or plated and thereby cause a discontinuous plating layer or remain on such article. An additional object is to provide a device for treating liquids to remove undesired soluble material. Another object is to provide a simple agitating device incorporated within the filter structure which is independent of filtration action. A further object is to improve the priming operation and permit filtering of shallow tanks. A still further object is to facilitate transfer of filtered liquids to other tanks or remote locations.

The immersible filter of this invention comprises generally a filter unit within a longitudinal shell, having a pump suitably disposed at the bottom of the shell to draw in liquid from the bath and to propel it upward through the filter and out through the top of the filter unit to be directed back into the same bath or into a different tank for subsequent handling. An operating shaft for the submerged pump element extends upward through the center of the filtering unit to a motor that is provided with an adjustable supporting bracket for clamping the motor and the filter unit on the side of the tank containing the bath that is to be filtered. The motor supporting bracket is suitably secured to a part of the filter unit structure so adjustment of the motor on its supporting bracket will control the depth of immersion of the filter unit in the bath to be cleaned. Agitation is provided by a hole in the base of the device extending close to the pump below the filter unit. A portion of the liquid being pumped is expelled through the hole to cause agitation. The location of the pump at the bottom of the filter facilitates priming, since the pump cavity is the first to be filled. The unit need only be submerged for approximately two inches for priming purposes and thus is adapted to filter shallow tanks. An outer strainer and escape cavity are also provided at the bottom section to prevent larger particles from clogging the filter. By replacing the normal filter tube with a porous container filled with ion exchange resin or activated granular carbon, liquid can be pumped through the device for specific treatment purposes.

The details of construction of the filter, and the manner in which it operates, will become apparent upon reference to the accompanying drawing, in which the single figure shows a side view, partially in elevation, and partially in section, of a filter unit shown partially immersed in a bath that is to be cleaned. It is to be understood that the term "filter" in the present application is meant to cover a device for the removal of solid or dissolved constituents of a liquid or suspension.

As shown in the drawing, a tank 10 contains a solution or bath 11 which may be, for example, a plating solution, in which the filter element of an immersible filter 20 is partially immersed.

The filter 20 generally comprises a filter unit 22 provided with an impeller pump 24, which is provided with a drive shaft 26 extending upwardly through the filter unit to a drive motor 28. The motor drives the impeller pump 24 to draw a stream of the fluid from the bath 11 upward through the filter for cleaning and then by continuous pressure on the stream projects the stream of cleaned fluid outward through an outlet port 30 that is provided with a hose coupling or adapter 32 to receive a section of hose to conduct the cleaned fluid to a desired area, which may be the other end of the tank 10, or another tank for appropriate subsequent disposition.

Before proceeding to a description of the filter unit itself, it will be noted that the motor frame 28 is provided with a suitable supporting bracket 36 having a horizontal extension arm 38 that is suitably supported in a bracket 42 to be adjustably movable vertically on a vertical post 44 secured to an angular bracket 46. Bracket 46 may be located where desired on top of a tank rim flange 48, and there clamped in position by a C clamp 50. Two suitable spacing insulators 52 of any suitable material may be used for shock absorbing service. A material such as Neoprene would be suitable.

The motor 28 is provided with a motor adapter or bracket 56, suspended from the motor frame, and serving to support the filter unit itself.

The filter unit 22 comprises, generally, an external enclosing cylindrical shell 60, a coaxial and concentric inner tubular cylinder 62, a cylindrical filter 64 disposed concentrically between the outer shell 60 and the inner cylinder 62, a bottom shell cover and pump body 66 and a top cover 68 having an outlet port 69. The bottom cover 66 and the top cover 68 are compressed against two sealing rings 70 and 72, seated on the respective end edges of the outer cylinder 60, to seal cylinder 60 against leakage.

The bottom cover 66 performs several functions. It is provided with an internally threaded bore 74 which fits onto a similar threaded portion at the lower end of internal cylinder 62 to permit the cover 66 to be compressed tightly against the lower sealing ring 70. The lower cover 66 is also provided with a pump cavity 76 to accommodate the pump impeller 24 previously mentioned, and that cavity 76 communicates with the ambient surroundings outside of the cover through two or more inlet passages 78, through which the liquid of the bath may be drawn in by the rotating impeller of the pump 24 to be then transmitted into an annular input chamber 80 between the filter 64 and the enclosing outer cylinder 60.

The inlet passages 78 are provided in a pump cover 82 which includes a strainer 81, schematically shown as a broken line. The cover 82 is also provided with a removable strainer plug 84 to permit removal of dirt particles that have settled to the bottom of the pump cavity and have not been forced up into the filtering inlet chamber by the operation of the pump. The cover body 82 is secured to the lower portion of the main bottom cover 66 by suitable fastening screws 85. The passage area between the filter inlet and impeller also provides escape cavities for solid particles which enter through the strainer 81 but do not pass through the filter.

The bottom cover 66 is provided with a central bore 86, at the bottom of the cover, of sufficient diameter to permit the pump inpeller 24 to be moved axially through the bore when assembling or when separating the filter. The pump cover 82 is shown provided with a coaxial boss 83 that aids in centralizing the pump cover 82 when it is to be secured in position in the central bore of the bottom cover 66.

The bottom cover 66 has a central portion 67 which is made in one piece therewith, and a plurality of bores or passages 66' therebetween, leading from the pump cavity 76 to the annular input chamber 80, as illustrated.

An additional hole or orifice 87, is provided in cover 66 for the purpose of agitating the liquid to promote uniform filtration. A portion of the liquid drawn in by the pump is expelled by the impeller through the hole before entering the filter. Thus, agitation is caused which is independent of filtration action and will continue even though flow through the filter is completely stopped. As the filter tube clogs, circulation of the liquid increases through the orifice 87. The small outlet or port places no load on the motor and requires no extra parts. The hole may be drilled at any desired angle and may be of any reasonable diameter.

The main filter 64 is held in position by an annular step 88 at the top of the central portion of the bottom cover 66 and by a similar annular step 90 extending downward from the bottom of the top cover 68. These two annular steps 88 and 90 serve also as partitions to divide the chamber within the outer enclosing cylindrical shell into two chambers, the inlet chamber 80 previously referred to and an outlet chamber 92 which receives the filtered liquid that passes through the filter 64.

The bottom cover 66 and the top cover 68 are secured onto the inner cylinder 62 to hold the filter elements in place. The bottom cover 66 is threaded onto cylinder 62 at threaded section 74 and the top cover 68 is held in place by the pressure of a lock nut 98 threaded onto inner cylinder 62 at threaded section 100 and pressing against a resilient washer 102 of rubber or other acid-resisting material. A splash guard 104 fitted over cylinder 62 provides cover for the nut 98. The entire filter unit 20 is supported from the motor bracket 56 by means of a coupling bracket 106 that is secured onto the inner cylinder 62 by set screws 110. The coupling bracket 106 is secured to the motor bracket 56 by suitable screws or bolts 112.

A feature of the invention is the construction which permits easy assembly and disassembly. The pump drive shaft 26 can be easily coupled to or decoupled from the motor shaft by a suitable coupling sleeve 96 that is secured to the top of the pump shaft 26, by being threaded thereon, in the same way that the impeller is threaded onto the lower end of the pump shaft 26. The sleeve 96 slips over the lower end of the motor shaft and is secured to the motor shaft by two sets crews 14.

When the filter chamber becomes clogged with dirt, set screws 114 and 110 are loosened to permit removal of the entire filter unit from the motor. The splash guard 104 is raised, and lock nut 98 backed off to permit top cover 68 to be removed and then filter tube 64 removed and shell 60 cleared, for insertion of a new filter tube 64. For this operation of replacing the filter tube 64, the pump chamber need not be disturbed.

Another function of hte threaded strainer plug 84, at the pump chamber is that this plug may be removed temporarily to permit insertion of a hose fitting to receive a hose attached to a skimming device for skimming the surface of the solution, which solution then passes through the filter 64 to be clarified. An additional feature is that during this skimming and filtering of the surface liquid depth filtration takes place at the same time through the openings 78 in the pump cover body 82.

A further function of the threaded strainer plug 84 at the pump chamber is that this plug may be removed temporarily to permit insertion of a depth extension strainer down to any depth in the tank. This allows filtering liquid at any depth in the tank as well as at the level of the openings 78 in the pump cover and strainer body 82. For transfer purposes from a tank deeper than the cover 82, openings 78 are plugged and a depth extension strainer, down to any depth, replaces strainer plug 84.

The present device may also be utilized for removing soluble material by replacing the normal filter tube with a porous container filled with ion exchange resin or activated granular carbon, for example. The container can be a porous cotton sock filling the area between the outer cylindrical shell and the inner concentric cylinder, with a small area at the bottom and top for the inlet and outlet chamber respectively. Liquid flows from the inlet chamber into the porous container, through the resin or carbon and out of the top of the container to the outlet chamber and orifice.

Ion exchange resins, for example, may be used to convert liquid gold ions to solid gold which is trapped in the resin. In addition, such resins can remove carbon and magnesium ions in water, which cause hardness. Activated granular carbon can be used to absorb colloidal impurities such as organic matter, as in electroplating solutions.

The operation of the invention has been described in the environment of an extreme condition, such as a plating tank, to emphasize its range of utility. Obviously, the filter shown herein finds utility throughout the entire chemical industry. Thus, the nature of the solutions will dictate the kinds of materials to use in the filter structure. For vitamin and other pharmaceutical solutions, as well as those corrosive to metals, plastic acid resisting parts would be substituted for metal wetted parts. It is contemplated, by way of an example, that metals such as titanium, stainless steel, Hastelloy B or Hastelloy C, and plastics such as Teflon, epoxy and Lucite, could be used, in the filter chamber and the pump. For higher temperature applications, Pyrex could be used instead of Lucite.

The invention thus provides a simple inexpensive liquid filter that may be immersed in a working tank, to efficiently clean and treat the liquid even during operation. The invention is not limited to the exact details shown since they may be modified without departing from the spirit and scope of the invention.

What is claimed is:

1. An integral immersible filter and pump assembly maintained in a tank at a predetermined level, comprising a tubular filter, an impervious tubular cylinder extending co-axially within and spaced from said filter, an impervious tubular casing extending co-axially with respect to said filter and spaced outward therefrom, top cover means having a substantially centrally disposed aperture in alignment with said cylinder, first means for securing said top cover means in tight sealing engagement with the top ends of said filter, said cylinder and said casing, said top cover means including outlet chamber means in communication with the space between the interior of said filter and the exterior of said cylinder, bottom cover means, second means for securing said bottom cover means in tight sealing engagement with the bottom ends of said filter, said cylinder and said casing, said bottom cover means including a pumping chamber having discharge means in communication with the space between the exterior of said filter and the interior of said casing, a central inlet opening in said bottom cover means and in communication with the liquid in said tank surrounding the bottom cover means and with said pumping chamber, a centrifugal impeller within said pumping chamber for urging the liquid into said space between the exterior of said filter and the interior of said casing, thence across the wall of said filter, in inward direction, and through said outlet chamber means, drive means for rotating said impeller and including a shaft extending through said aperture on the top cover means and said cylinder, said first securing means including first coupling means bearing against said top cover means and in releasable engagement with a portion of said cylinder, said drive means including second coupling means for releasably connecting the same to said shaft, whereby said filter may be removed from the assembly for cleaning and replacement upon disengaging said first and second coupling means, said outlet chamber means being at the end of the assembly opposite said inlet opening, whereby for self-priming of the assembly it is sufficient to immerse said bottom cover means below said liquid level.

2. A filter and pump assembly according to claim 1, further comprising a by-pass opening formed in said bottom cover means adjacent the periphery of said impeller, spaced apart from said inlet opening and extending radially outward from said bottom cover means, whereby a portion of the pumped liquid is discharged into said tank at a location adjacent said bottom cover means, to agitate the liquid entering said inlet opening.

3. A filter and pump assembly according to claim 2, further comprising strainer means in said bottom cover means, intermediate said inlet opening and said pumping chamber.

References Cited by the Examiner
UNITED STATES PATENTS

| | | | |
|---|---|---|---|
| 1,785,480 | 12/30 | Durdin. | |
| 2,100,482 | 11/37 | Irwine | 210—416 |
| 2,392,901 | 1/46 | Brown | 210—416 |
| 2,448,157 | 8/48 | Schneider | 210—416 |
| 2,524,336 | 10/50 | Vokes | 210—234 |
| 2,537,992 | 1/51 | Gross et al. | 210—315 X |
| 2,563,862 | 8/51 | Nechine. | |
| 2,667,270 | 1/54 | Cady et al. | 210—542 X |
| 2,803,347 | 8/57 | Whitlock | 210—190 |
| 2,890,659 | 6/59 | Haentjens et al. | |

FOREIGN PATENTS

| | | |
|---|---|---|
| 811,764 | 4/59 | Great Britain. |

References Cited by the Applicant
UNITED STATES PATENTS

| | | |
|---|---|---|
| 1,957,303 | 5/34 | Tietig. |
| 2,238,003 | 4/41 | Wilkinson. |
| 2,277,738 | 3/42 | Wilkinson. |
| 2,332,965 | 10/43 | Ducommun et al. |
| 2,394,076 | 2/46 | Kisch. |
| 2,401,067 | 5/46 | Grauberg. |
| 2,419,146 | 4/47 | Kimm et al. |
| 2,649,205 | 8/53 | Quinn. |
| 2,854,141 | 9/58 | Barnstead. |
| 2,886,180 | 5/59 | Morgan et al. |

REUBEN FRIEDMAN, *Primary Examiner*.

CHARLES SUKALO, HARRY B. THORNTON, *Examiners*.